Figure 1:
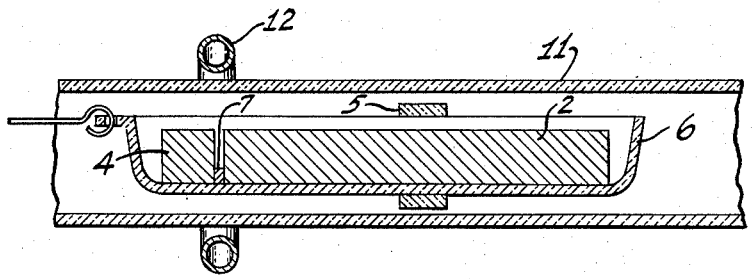

July 1, 1958

R. V. JENSEN ET AL 2,841,509

METHOD OF DOPING SEMI-CONDUCTIVE MATERIAL

Filed April 27, 1955

INVENTOR.
ROBERT V. JENSEN AND
ROBERT A. LAFF
BY

*ATTORNEY*

United States Patent Office 2,841,509
Patented July 1, 1958

2,841,509

METHOD OF DOPING SEMI-CONDUCTIVE MATERIAL

Robert V. Jensen, Trenton, N. J., and Robert A. Laff, West Lafayette, Ind., assignors to Radio Corporation of America, a corporation of Delaware Application April 27, 1955, Serial No. 504,230

13 Claims. (Cl. 148—1.5)

This invention relates generally to improved methods for dissolving a relatively low boiling or sublimation point material in a relatively high melting point molten material. More particularly, but not necessarily exclusively, the invention relates to the alloying of low boiling or low sublimation point conductivity-type-determining impurities with high melting point molten semi-conductive materials.

It is known to control the type of conductivity of semi-conductive materials by introducing thereinto small amounts of certain foreign materials generally termed "impurities." The introduction of such impurities into semi-conductive materials is usually referred to as "doping." The type of conductivity established in the semiconductor is dependent upon the electron configuration of the atoms of the impurity material and of the host crystal. Thus, a substance whose atoms are capable of giving up electrons to the atoms of a particular substance is termed a "donor" impurity, and, since there is a surplus of electrons available to carry a current, the semi-conductor so doped is deemed to be of n-type (negative) conductivity. On the other hand, a substance whose atoms are capable of borrowing or accepting electrons is termed an "acceptor" impurity, and, since there is a shortage of electrons in the crystal lattice available for current conducton, the semi-conductor so doped is deemed to be of p-type (positive) conductivity.

The usual and most directly convenient manner of introducing impurities into a semi-conductor is to add the impurity into a melt of the semi-conductive material. Most semi-conductive materials have relatively high melting points. Silicon, for example, melts at 1420° C. Great difficulty is therefore encountered in attempting to dope such high melting point semi-conductors with lower boiling point impurities inasmuch as such impurities boil off either prior to introduction into the semi-conductor melt or before dissolving in the molten semi-conductor. This is especially true when the boiling point of the impurity is greatly lower than the semi-conductor melting point. Some impurities sublime rather than boil at relatively low temperatures and it is intended throughout the instant specification and in the claims appended hereto to include sublimation in the phrase "boiling point." Typical impurities having troublesome boiling points are antimony (boiling point 1380° C.), red phosphorus (boiling point 280° C.), arsenic (sublimation point 615° C.), tellurium (boiling point 1390° C.), selenium (boiling point 688° C.) and magnesium (boiling point 1107° C.). Even the semi-conductive compounds aluminum antimonide and cadmium telluride have melting points too high (1050° C. and 1040° C., respectively) to be doped with some of these materials, namely arsenic, phosphorus, and selenium. The same is also true for the semiconductor germanium which melts at 940° C.

It is therefore an object of this invention to provide an improved method of dissolving one material in the melt of a second material whose melting point is higher than the boiling point of the first named material without boiling-off the first-named material.

Another object of this invention is to provide an improved method of doping a semi-conductive material in the molten phase thereof with an impurity whose boiling point is lower than the melting point of said semi-conductive material without boiling-off the impurity.

These and other objects and advantages are accomplished according to the invention by first forming an alloy wherein the minor constituent is a relatively volatile impurity material and the major constituent is a second material whose boiling point is higher than the melting point of the host crystal material in which it is desired to introduce the volatile impurity. Furthermore, the major constituent should be one which can be alloyed with the minor constituent at a temperature below the boiling point of the minor constituent. The alloy is added to the molten host crystal material either in molten form or as a solid. Since the major constituent of the alloy is selected such that the boiling point of the alloy is higher than the melting point of the host crystal material, the relatively low boiling point impurity does not boil off and become lost.

Figure 2:
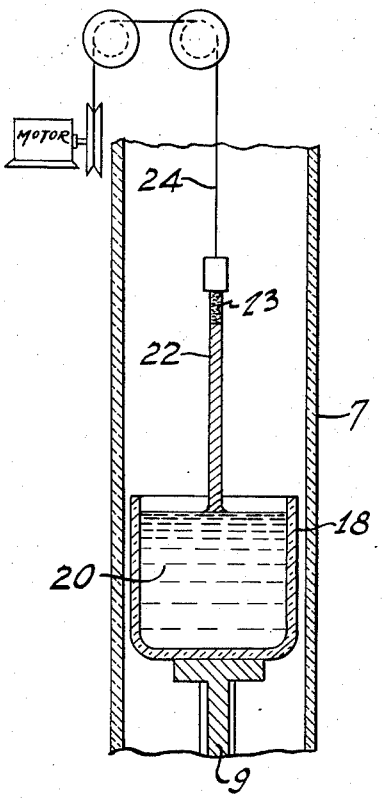

The invention will be described in greater detail by reference to the accompanying drawing wherein:

Figure 1 is a cross-sectional elevational view of an elongated crucible being drawn through an induction type furnace; and Figure 2 is a partially cross-sectional elevational view of an apparatus for pulling a crystal from a melt.

A semi-conductive material such as germanium can be doped with a volatile impurity such as arsenic by employing the apparatus shown in Figure 1 in accordance with the invention. An elongated boat-like crucible 6 of graphite is charged with a rod-shaped piece of base material 2, such as germanium. A purified seed crystal 4 is placed at one end of the crucible 6 close to but not in contact with the germanium charge. Between the seed crystal 4 and the germanium charge 2 an impurity-carrying alloy 7 of arsenic and tin is placed. The arsenic-tin alloy may be in any convenient form, such as pellets, for example.

The crucible is placed within a quartz tubular enclosure 11 and is gradually drawn, at about 2.5 inches per hour or less, for example, through a ring-shaped induction heating element 12 starting at the seed crystal end of the crucible. The crucible is supported within the enclosure 11 by a ring-shaped member 5. At the start of the pulling operation, when the temperature reaches the melting point of the germanium, part of the seed 4 melts as well as all of the arsenic-tin alloy 7, and the adjacent part of the germanium charge 2. The molten arsenic as well as the tin diffuse throughout the melt and as the crucible with its contents is propelled through the heating element 12, successive segments of the charge 2 are melted. Re-crystallization of the materials occurs as the crucible leaves the heat zone created by the heating element 12. By reason of the segregation coefficient of arsenic in germanium (0.06), which is defined as the ratio of the impurity (arsenic) concentration in the solid side of the interface of a growing crystal to the concentration on the liquid side of the interface, six of every 100 arsenic atoms available in the melt will segregate to and freeze-out with the germanium. Thus the arsenic atoms, by segregating to the solidifying germanium single crystal, are able to establish the crystal conductivity-type as the molten materials re-crystallize. Some of the tin present in the melt also segregates to and freezes out with the growing crystal according to its segregation coefficient (0.005). Since the carrier (tin) of the impurity-carrying alloy has a boiling point (2260° C.) well above the melting point of germanium (940°

C.), the boiling point of a 90 mol percent tin–10 mol percent arsenic alloy is higher than the melting point of germanium. Therefore, none of the arsenic being carried in the alloy will be lost by vaporization and is available to change the conductivity of the germanium single crystal being grown.

With the alloy of 90 mol percent tin and 10 mol percent arsenic the conductivity of the germanium is affected only by the arsenic atoms entering the single crystal lattice of germanium since the tin, being tetravalent, and having no free electrons or holes, does not ionize in the Ge lattice. The segregation coefficient ($k$) of arsenic in germanium is 0.06. The segregation coefficient ($k$) is determined by the expression $$k = \frac{C_s}{C_l}$$

where $C_l$ is the concentration of impurity in the liquid and $C_s$ is the concentration of impurity in a solute crystallized from said liquid.

In one example, 100 grams of germanium brought into contact with 0.75 mg. of an alloy of 90 mol percent tin and 10 mol percent arsenic ($k$ in Ge=0.06) results in a single crystal of germanium having a mole percent concentration of $10^{-8}$ arsenic initially and resistivity of 4 ohm-cm. With this alloy, a mol percent concentration of $7.5 \times 10^{-9}$ tin occurs in the germanium crystal. While the tin will not significantly affect the resistivity of the crystal, other properties (e. g., mobility) may be affected if the concentration is too great. With the small concentration of tin obtained with the alloy in this example deleterious effects on other properties of the doped semi-conductive are also insignificant. This is generally true for the materials of the present invention where the impurities are present in the final crystal in trace amounts of a very small fraction of one percent.

In another example, semi-conductive silicon is doped with a relatively low boiling point impurity such as antimony employing the apparatus shown in Figure 2. It should be understood, however, that the apparatus shown in Figure 1 could likewise be employed, if desired, in the instant example. In Figure 2, a pot-type crucible 18 which may be of silica, for example, is supported by a pedestal 9 of firebrick or other heat-insulating material in a quartz container 7, and heated by conventional means (not shown). The crucible is charged with silicon 20, for example 50 grams, and a seed of single crystal silicon 23 attached to a withdrawing apparatus 24 is touched onto the surface of the molten silicon in the crucible. As the seed 23 is slowly withdrawn, an elongated single crystal 22 is attached thereto. The seed crystal is withdrawn at a rate of 0.5 cm. per hour or less, for example. An alloy of 95 mol percent germanium–5 mol percent antimony is added to the silicon melt in ingot, powder, or pellet form where it melts and diffuses throughtout the molten mass. Since the carrier (germanium) of the impurity-carrying alloy has a boiling point (2700° C.) well above the melting point of silicon (1420° C.), the boiling point of a 95 mol percent germanium alloy will be higher than the melting point of silicon. Therefore, none of the antimony being carried in the alloy will be lost by vaporization and is available to establish the conductivity of the silicon single crystal being grown.

With an alloy of 95 mol percent germanium and 5 mol percent antimony, the conductivity of the silicon is affected only by the antimony atoms entering the single crystal lattice of silicon since the germanium does not ionize in the silicon lattice. The segregation coefficient ($k$) for antimony in silicon is 0.012. Therefore the concentration ratio of antimony in the liquid and the solid is 1,000 to 12 respectively.

As for example, a melt of 100 grams of silicon to which has been added 11.3 mg. of an alloy of 95 mol percent germanium and 5 mol percent antimony ($k$ in Si=0.012) results in a single crystal of silicon having a mol concentration of $10^{-8}$ antimony initially and a resistivity of 4 ohm-cm. With this alloy a mol concentration $2 \times 10^{-6}$ germanium occurs in the silicon crystal. As explained before, while germanium will not significantly affect the resistivity of the crystal, it is desirable to introduce as small an amount thereof as possible to avoid affecting other properties (e. g., mobility). With the small concentration of germanium obtained with the alloy in this example, deleterious effects on other properties of the doped silicon are insignificant.

When doping semi-conductors according to the invention, a carrier preferably is selected which either does not ionize when molten or which has an extremely small segregation coefficient with respect to the segregation coefficient of the doping agent. Thus, in the latter case, so little of the carrier enters into the solidified semiconductor crystal in comparison with the amount of the doping agent entering the crystal that the carrier does not materially adversely affect the conductivity or other properties of the crystal. In order for the conductivity of the crystal to be determined substantially only by the doping agent, the ratio of doping agent concentration to the carrier concentration in the solid crystal generally should be at least 4:1. If the carrier and the doping agent are completely miscible in all proportions then an alloy of any percentage composition may be employed as just pointed out except where it is desired not to have an undue amount of carrier present in the solidified crystal. In some instances the carrier and the doping agent are not miscible in all proportions. In this case the percentage composition of the alloy must be limited to those percentages which will provide a single phase alloy having a boiling point higher than the melting point of the semi-conductive crystal material.

In preparing the alloy it is essential that the boiling-off of the volatile material must be prevented. Preferably, one way to accomplish this is to employ a major constituent which itself has a melting point below the boiling point of the minor constituent. This is not mandatory, however, since the constituents can have a liquid solubility of one in the other at a temperature below the boiling point of the minor constituent. It is necessary that the volatile impurity be a minor constituent of the alloy inasmuch as the boiling point of the alloy itself will tend to approach that of its major constituent. However, in doping semi-conductive materials only trace amounts (a very small fraction of one percent) of the impurity material are required, hence the limitations imposed in preparing the alloy containing a minor amount of the impurity are relatively insignificant.

Some of the most difficult impurities to introduce into any molten semi-conductor are arsenic, phosphorous, selenium, cadmium and cesium because of their extremely low boiling points (615° C., 280° C., 688° C., 767° C., and 670° C., respectively). For the same reason it is desirable to alloy these impurities with carriers having correspondingly low melting points. According to the invention, arsenic can be used as a doping agent for silicon, for example, by alloying the arsenic with tin or lead. Neither of these carriers ionizes, hence will not enter into the crystal structure of the silicon and affect its conductivity. Likewise, the boiling points of tin and lead are so high (2260° C. and 1620° C., respectively) that once the alloy is formed its boiling point, which will be near that of the carrier, will be well above the melting point of silicon (1420° C.). A 95% tin–5% arsenic alloy will form at 350° C. and a 97% lead–3% arsenic alloy can be formed at 288° C. Both of these temperatures are well below the boiling point of arsenic.

Phosphorus, which melts and boils at 44° C. and 280° C., respectively, can likewise be alloyed with tin. A 99% tin–1% phosphorus alloy will be formed at 280° C. which is just at the boiling point of phosphorus, Selenium, cadmium, and cesium melt at 220° C., 320.9° C. and 28.5° C., respectively. These elements can also be alloyed with tin or lead. With selenium for an example, the highest temperature needed in order to form an alloy of 97% lead or 95% tin is 650° C. which is well below the boiling point of selenium.

Antimony melts and boils at 630° C. and 1380° C., respectively; tellurium at 452° C. and 1390° C., respectively; and magnesium at 651° C. and 1107° C., respectively. These impurities can therefore be alloyed with carriers having melting points higher than those of lead or tin although these may still be used. Antimony, tellurium, and magnesium can be alloyed with any of the following carriers in addition to tin or lead, without danger of reaching their boiling points: germanium (melting at 940° C.), copper (melting at 1083° C.), and gold (melting at 1063° C.). The germanium-antimony alloy is a desirable one for introducing antimony into molten semi-conductors other than germanium. Since the only commonly used semi-conductor whose melting point exceeds the boiling points of antimony, tellurium, and magnesium is silicon, the problem of avoiding boil-off usually only arises when doping silicon. Although such alloys may be used to dope semi-conductors other than silicon, in all other cases the use of the alloy for the purpose of preventing the volatilization of the impurity would normally be superfluous since all the temperatures to be encountered are below the boiling points of these impurities. If it is desired to maintain the temperature of such semi-conductors as germanium well above the melting point thereof, such alloys are of advantage.

As pointed out previously, tin and lead are excellent carriers in alloys, according to the invention, inasmuch as these elements do not ionize in germanium or silicon due to their tetravalency. They therefore do not affect the conductivity of the semi-conductor being doped. Germanium likewise does not ionize in silicon and hence may be used as a carrier in silicon alloys in the same manner and with the same advantages as tin and lead.

Copper and gold, however, do ionize in germanium or silicon and they would affect the conductivity of the doped single crystal except for the fact that the amount of each which enters the solid crystal is relatively insignificant with respect to the amount of the doping agent therein. This is due to the fact that the segregation coefficients of copper and gold are very small in comparison with the segregation coefficients of any of the other doping materials mentioned. The segregation coefficient ($k$) of copper in germanium in 0.000016 and in silicon 0.0004 while the segregation coefficient ($k$) of gold in germanum is 0.00003 and in silicon 0.00029. The doping agents which can be alloyed with copper and gold include antimony, tellurium, and magnesium. The segregation coefficients of antimony are 0.005 in germanium and 0.012 in silicon. The conductivity of the semi-conductive single crystal is determined substantially only by that impurity which exceeds all others by a ratio of 4:1 in the grown crystal. Hence, when doping silicon with an alloy of 85 mol percent copper and 15 mol percent antimony, the mol ratio in the solid crystal of antimony to copper is 5:1, while with an alloy of 85 mol percent gold and 15 mol percent antimony the mol ratio of antimony to gold is 6:1 in the solid crystal. In 50-50 mol percent alloys of these elements the mol ratios in the solid are 30:1 (antimony:copper) and 40:1 (antimony:gold).

In doping semi-conductors according to the invention the final product is itself an alloy whose major constituent is the semi-conductive material with relatively minor amounts of the conductivity-type-determining impurity and the carrier agent. In one of the examples previously described, a single crystal of germanium is obtained containing trace amounts of arsenic and tin, while in the other example a single crystal of silicon is obtained containing trace amounts of germanium and antimony. The concentration of the conductivity-type-determining impurity required in the final single crystal of semi-conductor purposes is preferably no more than $10^{-5}$. As shown in the two examples, a concentration of $10^{-8}$ mol percent arsenic and $10^{-8}$ mol percent antimony were obtained in germanium and silicon, respectively, which resulted in each crystal having a resistivity of 4 ohm-cm. which is of the order generally useful in semi-conductor devices.

Any of the semi-conductors can be doped according to the present invention to obtain the advantages thereof. The invention is of particular advantage in connection with the doping of silicon, because of its high melting temperature. However, the same general problems are solved by the invention in doping other semi-conductors with relatively lower boiling point materials.

Other semi-conductors with which the invention may be employed to advantage are germanum, aluminum antimonide, and cadmium telluride.

What is claimed is:

1. The method of dissolving a conductivity-type-determining impurity material into a semi-conductive material whose melting point is higher than the boiling point of said impurity material comprising the steps of melting said semi-conductive material and: adding said impurity material into said semi-conductive material when liquidized in the form of an alloy consisting essentially of said impurity material and a carrier material different from said semi-conductive material whose boiling point is higher than the melting point of said semi-conductive material, the composition of said alloy being such that it is single phase and has a boiling point higher than the melting point of said semi-conductive material.

2. The method according to claim 1 wherein said semi-conductive material is selected from the class consisting of germanium and silicon.

3. The method according to claim 2 wherein said semi-conductive material is germanium, said first material is selected from the class consisting of arsenic, phosphorus, selenium, cadmium, and cesium, and said third material is selected from the class consisting of tin and lead.

4. In the method of doping silicon with a conductivity-type-determining impurity material selected from the class consisting of antimony, tellurium, cadmium, selenium, cesium, arsenic, phosphorous, and magnesium the step of: preparing a melt of said silicon and an alloy containing said impurity material, by raising the temperature of said silicon and said alloy above the melting point of said silicon, while said alloy is adjacent to said silicon, said alloy consisting essentially of said impurity material and a carrier material selected from the class consisting of germanium, tin, lead, copper, and gold, the composition of said alloy being such that it is single phase and has a boiling point higher than the melting point of said silicon.

5. The method of doping a semi-conductive single crystalline material with a conductivity-type-determining impurity material whose boiling point is lower than the melting point of said semi-conductive material, comprising the steps of: forming an alloy of said impurity material with a carrier material different from said semi-conductive material whose boiling point is higher than the melting point of said semi-conductive material, the composition of said alloy being such that it is single phase and has a boiling point higher than the melting point of said semi-conductive material, preparing a melt of said semi-conductive material and said alloy, by raising the temperature of said semi-conductive material and said alloy above the melting point of said semi-conductive material, while said alloy is adjacent to said semi-conductive material, and initiating and maintaining single crystalline growth of said semi-conductive material from said melt.

6. The method of doping a semi-conductive single crystalline material with a conductivity-type-determining impurity material whose boiling point is lower than the melting point of said semi-conductive material, comprising the steps of: forming an alloy of said impurity material with a carrier material different from said semi-conductive material whose boiling point is higher than the melting point of said semi-conductive material, the composition of said alloy being such that it is single phase and has a boiling point higher than the melting point of said semi-conductive material, preparing a melt of said semi-conductive material and said alloy, by raising the temperature of said semi-conductive material and said alloy above the melting point of said semi-conductive material, while said alloy is adjacent to said semi-conductive material, and initiating and maintaining single crystalline growth of said semi-conductive material from said melt, the percentage of said carrier material in said alloy and the segregation coefficients of said carrier material and said impurity material being such as to result in a concentration ratio of at least 4:1 of said impurity material to said carrier material in said single crystalline growth of said semi-conductive material.

7. The method of growing a single crystal of semi-conductive material containing a conductivity-type-determining impurity material whose boiling point is lower than the melting point of said semi-conductive comprising the steps of: preparing a melt of said semi-conductive material and an alloy by raising the temperature of said semi-conductive material and said alloy above the melting point of said semi-conductive material, while said alloy is adjacent to said semi-conductive material, said alloy consisiting essentially of said impurity material and a carrier material different from said semi-conductive material whose boiling point is higher than the melting point of said semi-conductive material, the composition of said alloy being such that it is single phase and has a boiling point higher than the melting point of said semi-conductive material, contacting a seed crystal of said semi-conductive material to said melt until a single crystal of said semi-conductive material starts to grow attached thereto, and relatively moving said seed crystal away from said melt as said single crystal continues to grow.

8. The method of growing a single crystal containing a conductivity-type-determining impurity material whose boiling point is lower than the melting point of said semi-conductive material by horizontally zone melting an elongated body of said semi-conductive material comprising the steps of: placing at one end of said elongated body of said semi-conductive material a mass of an alloy consisting essentially of said impurity material and a carrier material different from said semi-conductive material whose boiling point is higher than the melting point of said semi-conductive material, the composition of said alloy being such that it is single phase and has a boiling point higher than the melting point of said semi-conductive material, melting said alloy mass and a portion of said end of said elongated body of semi-conductive material, initiating single crystalline growth of said semi-conductive material from said melted portion of said semi-conductive material and thereafter melting and freezing-out successive adjacent portions of said elongated body of said semi-conductive material whereby a single crystal of said semi-conductive material is grown containing said impurity material.

9. The method according to claim 8 wherein said single crystalline growth is initiated by contacting a seed crystal of said semi-conductive material to said melt.

10. The method of growing a single crystal of silicon containing impurity centers of a material selected from the class consisting of arsenic, antimony, phosphorus, tellurium, magnesium, cadmium, selenium, and cesium comprising the steps of: preparing a melt of silicon and an alloy by raising the temperature of said semi-conductive material and said alloy above the melting point of said semi-conductive material, while said alloy is adjacent to said semi-conductive material, said alloy consisting essentially of said impurity material and a carrier material selected from the class consisting of tin, lead, copper, gold, and germanium, the proportions of ingredients in said alloy being such that it has a boiling point higher than the melting point of silicon, and initiating and maintaining single crystalline growth of said silicon from said melt.

11. A method according to claim 10 wherein said single crystalline growth is initiated by contacting a seed crystal of silicon to said melt and thereafter maintaining said single crystalline growth by relatively moving said seed crystal away from said melt.

12. The method according to claim 11 wherein said melt is prepared by melting an end portion of an elongated body of said silicon together with a mass of said alloy, and said single crystal is grown by horizontally zone melting successive adjacent portions of said elongated body of said silicon.

13. The method of dissolving a conductivity type determining impurity material selected from the class consisting of arsenic, antimony, phosphorous, tellurium, magnesium, cadmium, selenium, and cesium into a silicon semi-conductor material comprising the steps of: melting said semi-conductor material and adding said impurity material into said semi-conductive material when liquidized in the form of an alloy consisting essentially of said impurity material and a carrier material selected from the class consisting of tin, lead, gold, copper, and germanium, the composition of said alloy being such that it is single phase and has a boiling point higher than the melting point of said semi-conductive material.

References Cited in the file of this patent

UNITED STATES PATENTS

| | | |
|---|---|---|
| 1,334,089 | Grenagle | Mar. 16, 1920 |
| 1,877,261 | Weiger | Sept. 13, 1932 |
| 2,703,296 | Teal | Mar. 1, 1955 |
| 2,727,839 | Sparks | Dec. 20, 1955 |
| 2,736,847 | Barnes | Feb. 28, 1956 |
| 2,739,088 | Pfann | Mar. 20, 1956 |
| 2,742,383 | Barnes et al. | Apr. 17, 1956 |

FOREIGN PATENTS

| | | |
|---|---|---|
| 727,678 | Great Britain | Apr. 6, 1955 |

OTHER REFERENCES

American Foundryman, August 1949, pp. 36–38.